(12) United States Patent
Schaffler et al.

(10) Patent No.: US 7,907,057 B2
(45) Date of Patent: Mar. 15, 2011

(54) COMMUNICATION DEVICE AND AN ELECTRIC CIRCUIT FOR A COMMUNICATION DEVICE

(75) Inventors: Gerald Schaffler, Graz (AT); Erich Merlin, Gratkom (AT)

(73) Assignee: NXP B.V., Eindhoven (NL)

( * ) Notice: Subject to any disclaimer, the term of this patent is extended or adjusted under 35 U.S.C. 154(b) by 330 days.

(21) Appl. No.: 12/299,536

(22) PCT Filed: Apr. 27, 2007

(86) PCT No.: PCT/IB2007/051572
§ 371 (c)(1),
(2), (4) Date: Nov. 4, 2008

(87) PCT Pub. No.: WO2007/129252
PCT Pub. Date: Nov. 15, 2007

(65) Prior Publication Data
US 2009/0189769 A1 Jul. 30, 2009

(30) Foreign Application Priority Data
May 4, 2006 (EP) .................................. 06113531

(51) Int. Cl.
G08B 13/14 (2006.01)
H03H 7/38 (2006.01)
(52) U.S. Cl. .............. 340/572.7; 340/538.14; 340/539.1; 333/32
(58) Field of Classification Search ............... 340/572.7, 340/572.1, 10.51, 538.14, 538.15, 539.1, 340/539.11, 825.72, 825.73; 333/32; 343/724, 728, 876, 747, 745
See application file for complete search history.

(56) References Cited

U.S. PATENT DOCUMENTS

| | | | | |
|---|---|---|---|---|
| 5,589,844 A * | 12/1996 | Belcher et al. | ................ | 343/860 |
| 6,215,456 B1 * | 4/2001 | Nakanishi | ..................... | 343/895 |
| 6,590,538 B1 * | 7/2003 | Koyanagi et al. | ............. | 343/702 |
| 6,879,809 B1 | 4/2005 | Vega et al. | | |
| 7,174,142 B2 * | 2/2007 | Watabe | ...................... | 455/193.1 |
| 7,277,677 B2 * | 10/2007 | Ida et al. | ......................... | 455/78 |
| 7,786,819 B2 * | 8/2010 | Ella et al. | ..................... | 333/17.3 |
| 2002/0093426 A1 | 7/2002 | Jackson et al. | | |
| 2003/0052783 A1 | 3/2003 | Sitzman | | |

FOREIGN PATENT DOCUMENTS

| WO | 0115931 A1 | 3/2000 |
|---|---|---|
| WO | 0046917 A1 | 8/2000 |
| WO | 0167413 A1 | 9/2001 |
| WO | WO 2009081337 A1 * | 7/2009 |

* cited by examiner

Primary Examiner — Toan N Pham

(57) ABSTRACT

An electric circuit for a communication device (200) for communicating with a further communication device (500), the electric circuit comprising an inductive antenna element (101) adapted for inductively communicating with the further communication device (500), a capacitive antenna element (102) adapted for capacitively communicating with the further communication device (500), and a common matching circuit (105) adapted to match impedances of the inductive antenna element (101) and of the capacitive antenna element (102).

10 Claims, 3 Drawing Sheets

COMMUNICATION DEVICE AND AN ELECTRIC CIRCUIT FOR A COMMUNICATION DEVICE

FIELD OF THE INVENTION

The invention relates to an electric circuit for a communication device.

Moreover, the invention relates to a communication device.

BACKGROUND OF THE INVENTION

The importance of automatic identification systems is ever increasing, particularly in the service sector, in the field of logistics, in the field of commerce and in the field of industrial production. Further applications of identification systems are related to the identification of persons and animals.

In particular contactless identification systems like transponder systems (for instance using an RFID tag) are suitable for a wireless transmission of data in a fast manner and without cable connections that may be disturbing. Such systems use the emission and absorption of electromagnetic waves, particularly in the high frequency domain.

Another communication scheme is the "Active Digital Aura" technology (see http://www.research.philips.com/password/archive/22/downloads/pw22_wireless.pdf, or see WO 01/15931 A1), which is based on the recognition that connecting without wires does not necessarily mean "communication over air". The Active Digital Aura technology, for example, utilizes an electric field rather than an electromagnetic field to transmit information. By capacitively coupling the signal from a small body-worn tag into a body, an electric field is generated that extends outwardly a couple of centimeters from the entire surface of the skin. The tag, which may be built into a wristband, modulates this electric field with a unique digital identification code. Authorized devices that come close to the skin can pick up this identification code and configure themselves to a user specific personal profile, while authentication mechanisms between the tag and the device protect privacy and security. For in-home patient monitoring systems body sensors may be used that use personal identity information to automatically configure themselves to monitor specific medical conditions. This technology can furthermore be used for mobile phones or MP3 players that automatically configure themselves to personal tastes and preferences the instant a person picks them up.

WO 01/67413 discloses a radio frequency identification (RFID) system employing electrostatic technology, capacitive coupling of electric fields, electromagnetic technology, inductive coupling of magnetic fields, and combinations thereof, to communicate power and data signals to and from a source device (readers) and a remotely located transceiver (tags). In the combined electrostatic and electromagnetic communication system a single electromagnetic and electrostatic reader is provided that combines electromagnetic technology with electrostatic technology such that a reader is backward compatible and can support either electromagnetic radio frequency identification (RFID) tags or electrostatic RFID tags. A reader is designed to include both electrostatic electrodes and electromagnetic induction coils and incorporates additional modifications including those to a receiver in order for the reader to support both electromagnetic RFID transceivers and electrostatic RFID transceivers in the combination electrostatic and electromagnetic communication system.

However, the system of WO 01/67413 suffers from problems which may occur when combining such different technologies like electrostatic technology, capacitive coupling of electric fields, electromagnetic technology, and inductive coupling of magnetic fields.

OBJECT AND SUMMARY OF THE INVENTION

It is an object of the invention to provide a communication system having a proper performance.

In order to achieve the object defined above, an electric circuit for a communication device is provided, which communication device is adapted for communicating with a further communication device, the electric circuit comprising:
  at least two inputs for connecting an inductive antenna element to said electric circuit;
  at least one input for connecting a capacitive antenna element to said electric circuit; and
  a common matching circuit connected to said inputs and adapted to match the impedances of the inductive antenna element and of the capacitive antenna element to further units of said electric circuit, which are adapted to process a signal received via said inductive antenna element and/or said capacitive antenna element.

In order to achieve the object, furthermore a communication device for communicating with a further communication device is provided, the communication device comprising:
  an inventive electric circuit;
  an inductive antenna element adapted for inductively communicating with the further communication device and connected to said electric circuit via said inputs; and
  a capacitive antenna element adapted for capacitively communicating with the further communication device and connected to said electric circuit via said inputs;

Data processing, which may be performed according to embodiments of the invention, can be realized by a computer program, that is by software, or by using one or more special electronic optimization circuits, that is in hardware, or in hybrid form, that is by means of software components and hardware components.

The term "communication device" may particularly denote a reader device, a write device, or a combined read and write device for reading information from a further communication device and/or for programming information into the further communication device (for instance a transponder, a read/write device, a base station, or an RFID tag). The communication device may be adapted for unidirectional or for bi-directional communication. Thus, such a communication device may be any device that communicates with a further device like a tag. Such a communication device may also be denoted as an interrogator and may be a device that communicates with a further device like an RFID tag to retrieve and/or write information to the further device.

The communication device may also be a transponder. The term "transponder" may particularly denote an RFID tag or a smart card. More generally, a transponder may be a device (for instance a chip) which may automatically transmit certain (for example coded data) when activated by a special signal from an interrogator.

The term "inductive" may relate to a magnetic communication scheme. Thus, such an electric interaction scheme may employ induction effects.

The term "capacitive" may denote a property related to a capacitance or a capacitor. A capacitor may be denoted as a device comprising a pair of conductors, on which electric charges may be placed. The value of the capacity may be changed by material or a human body located between the capacitor plates.

The term "impedance matching" may particularly denote matching an output impedance of a source (like the capacitive antenna and/or the inductive antenna) to an input impedance of a load (like a processing circuit, which is separated from the capacitive antenna and/or the inductive antenna by the impedance matching circuit) to attain an improved signal or power transfer. In other words, a transfer of power or signals between adjoining circuit may be improved by ensuring that they have the same or adapted impedances.

According to an exemplary embodiment of the invention, a read and/or write device for a communication between a person carrying such a read and/or write device or communication device (for instance a mobile phone, an RFID tag, a medical sensor, etc.) and a further communication device may be provided. Such an embodiment may combine the options of an inductive communication scheme and of a capacitive (for instance human body) coupling in a single device, particularly by using one RF front end. Particularly, Near Field Communication and Active Digital Aura communication may be allowed by a single device. Thus, an inductive communication path and a capacitive communication path may be combined synergetically in a single apparatus so as to allow both communication paths to be operated independently from one another (for instance simultaneously or subsequently) without any disturbing cross-talk between the two systems.

Exemplary embodiments of the invention are based on the surprising recognition that, compared to a pure (inductive) Near Field Communication device, it may be sufficient to simply attach additional capacitor plates to such a device and to operate the device in the capacitive communication mode and in the inductive communication mode with one and the same matching circuit. This allows a proper performance with very low technical effort.

For providing a high quality performance of the system combing a capacitive communication path with an inductive communication path, which may be used individually or in combination, one single common or shared matching circuit may be provided and coupled between an inductive antenna and a capacitive antenna on the one hand and a processing circuit on the other hand. This exactly one common matching circuit, which may be provided for both the inductive antenna element and the capacitive antenna element in common, may match impedances of these communication components to a connected processing circuit. Thus, an easy, miniature and high performance system may be provided which significantly improves the functionality and the reliability in operation with respect to conventional systems.

An exemplary embodiment of the invention provides an RFID reader comprising a capacitive antenna (for instance a dipole antenna) and an inductive antenna (for instance a loop), both connected to a single matching circuit. The matching circuit in general may be used for matching the antenna impedance to the impedance of a receiving unit and logic circuit, which may be connected to the matching circuit. The receiving unit may comprise components like filters, a demodulator, etc.

Such a system may have an increased applicability and a higher degree of flexibility as compared to conventional communication systems. In particular, the radio range of an RFID tag may be increased by means of a capacitive coupling to the human body (for instance using an Active Digital Aura concept).

Therefore, particularly a capacitive coupling system (ADA, Active Digital Aura) may be combined in an advantage manner with an inductively coupled RFID system.

One exemplary aspect of the invention is to add the capacitive coupling to a standard inductive RFID system by just adding coupling plates. This can be done essentially without changing the receiver and matching circuit by adding the coupling plates in parallel to the inductive (for instance coil) antenna, allowing to use both communication channels in parallel. This means that the ADA communication is extending the, for instance, active Near Field Communication by the means of longer distance communication by the extension of the body, acting as a capacitive link in the pure ADA communication. An unexpected effect of this is that both communication channels work on the same device without significantly changing the receiving circuit.

Therefore, devices may be provided having both a purely capacitive and a purely inductive interface, having a common receiver and a common antenna matching circuit. Embodiments of the invention are based on the recognition that on the same matching circuit and at only one receiver both channels can be used by just adding both antennas.

According to an exemplary embodiment, an RFID reader/sensor/interrogator may be provided comprising a capacitive antenna (dipole) and an inductive antenna (loop) both connected to a single matching unit. The capacitive coupling plates may be added in parallel to the inductive (coil) antenna, allowing both communication channels in parallel. The antenna system can be used in circuits which are a combination of RFID tags (inductively coupled) and ADA (Active Digital Aura) systems. ADA is a capacitive coupling system.

According to an exemplary embodiment, a technique is provided for operating a reader/writer with a magnetic and a capacitive coupling which may be operated in the same frequency band (for instance in a high frequency band, particularly in a 13.56 MHz band) simultaneously. Thus, an extension of a magnetic antenna of a reader/writer by additionally implementing a capacitive coupling element may be made possible, without deactivating or disturbing the magnetic function.

According to a capacitive body coupling technology (like Active Digital Aura), a communication network may be established between two communication devices automatically when detecting that a human body has sufficiently approached a device or that two human bodies have been brought in contact (for instance by handshaking). After having initialized a communication channel, the communication may be started. In this context, the person(s) may contribute to the capacity of the capacitive coupling elements, for instance may form part of the dielectric material between capacitor plates.

According to an inductive coupling technology (like Near Field Communication), communication messages may be transmitted between two communication entities by an inductive coupling.

Embodiments of the invention may combine both communication schemes, and may match impedances for both communication paths. Particularly, the same communication protocol may be used for the capacitive coupling and for the inductive coupling may be made possible. Since it may be dispensable that the communication device actively switches between both communication modes, it may be dispensable to modify active components of the multiple communication scheme device as compared to a single communication scheme device.

Next, further exemplary embodiments of the electric circuit for a communication device for communicating with a further communication device will be explained. However, these embodiments also apply for the communication device.

The inductive antenna element may be a loop. A loop may be an antenna comprising a conducting coil of any convenient cross-section, generally circular or rectangular, that is capable of emitting and receiving radio energy. Such an inductive antenna element may be conventionally wired or may be also provided as a monolithically integrated circuit.

The capacitive antenna element may be a dipole antenna for transmitting or receiving electromagnetic radiation, for instance in the radio frequency band. The term "dipole antenna" has no necessary connection with dipole radiation. Again, the capacitive antenna element is usually formed in a wired solution. However, it is also possible to provide the capacitive antenna element as a monolithically integrated circuit component.

The inductive antenna element and the capacitive antenna element may be adapted for communicating sequentially or simultaneously. Particularly, the coupling of the two antenna elements to one and to the same matching circuit may allow to operate both antenna elements independently from one another. No active switching is required to switch between the two modes. In order words, an incoming signal may be processed capacitively or inductively, depending on the communication scheme used by a communication partner device. When using the capacitive and the inductive communication path simultaneously, no disturbing cross-talk between the two communication paths occurs.

The inductive antenna element and the capacitive antenna element may be adapted for communicating using the same frequency band, particularly in a high frequency band. For instance, a frequency of 13.56 MHz may be suitable. However, other frequency bands are possible. For example, for RFID tags, a frequency band of 902 MHz to 928 MHz may be used in the United States. A frequency band of 863 MHz to 868 MHz may be used in Europe. Other ISM bands ("industrial scientific medical") are possible, for instance 2.4 GHz to 2.83 GHz.

The electric circuit may be adapted at least partially as a monolithically integrated circuit. For instance, it is possible that components like the matching circuit and/or a digital logic or a processing circuit may be manufactured in integrated circuit technology, for instance using semiconductor technology (for instance silicon technology). However, it is also possible to provide individual elements of the electric circuit conventionally wired. For instance, in order to achieve proper values of the capacitance and of the inductance and to allow to modify the capacitive coupling scheme by the (macroscopic) human body, the capacitive antenna element and the inductive antenna element may be manufactured conventionally.

The capacitive antenna element may be adapted for capacitively communicating involving a body of a human user. Particularly, the capacitive antenna element may be adapted for capacitively communicating based on the above-discussed Active Digital Aura technology. For instance, it is possible that, by placing a human body between the capacity antenna plates or in sufficient vicinity of the capacity antenna plates, to use the presence of the human body to initiate a communication. For instance, a personal communication aura closely around the body may be used to provide a capacitive coupling for body coupled communication. This does not only allow for an ultra low power operation, but also to a high degree of security through authentication and encryption possibilities.

The inductive antenna element may be adapted for inductively communicating based on Near Field Communication (NFC). The term "Near Field Communication" technology or NFC is approved as the ISO/IEC 18092 standard and is a technology of bringing mobility to consumer electronics in an intuitive and psychologically comfortable way since the devices can hand-shake only when brought literally into touching distance.

The electric circuit or the communication device may be adapted for communicating with a radio frequency identification tag (RFID tag) or with a smart card.

An RFID tag may comprise a semiconductor chip (having an integrated circuit), in which data may be programmed and rewritten, and a high frequency antenna matched to an operation frequency band used. Besides the RFID tag, an RFID-system may comprise a read/write device and a system antenna enabling a bi-directional wireless data communication between the RFID tag and the read/write device. Additionally, an input/output device (e.g. a computer) may be used to control the read/write device. Different types of RFID-systems are distinguished, namely active RFID-systems (having their own power supply device included, for example a battery) and passive RFID-systems (in which the power supply is realized on the basis of electromagnetic waves absorbed by a coil and an antenna, respectively, wherein a resulting alternating current in the antenna may be rectified by a rectifying sub-circuit included in the RFID-system to generate a direct current).

A smart card or chip card can be a tiny secure crypto processor embedded within a credit card sized card or within an even smaller card, like a GSM card. A smart card does usually not contain a battery, but power is supplied by a card reader/writer, that is to say by a read and/or write device for controlling the functionality of the smart card by reading data from the smart card or by writing data in the smart card. A smart card device is commonly used in the areas of finance, security access and transportation. Smart cards may contain high security processors that function as a secure storage means of data like cardholder data (for instance name, account numbers, number of collected loyalty points). Access to these data may be made only possible when the card is inserted to a read/write terminal.

The common matching circuit may be adapted to match impedances of the inductive antenna element and of the capacitive antenna element with respect to a processing unit coupled to the common matching circuit. Such a processing unit may be a microprocessor which can be manufactured in silicon technology. It can comprise a receiving unit and/or a logic unit. It may further comprise a filter, demodulator, a logic circuit, an encrypting and/or decrypting feature, storage elements, energy supply units, etc.

Next, further exemplary embodiments of the communication device will be explained. However, these embodiments also apply for the electric circuit for such a communication device.

The communication device may be realized as a portable device.

The communication device may be a realized as a mobile phone, a GSM device, headphones, earphones, a headset, an earpiece, an ear set, a body-worn actuator, a gaming device, a laptop, a portable audio player, a DVD player, a CD player, a harddisk-based media player, an internet radio device, a public entertainment device, an MP3 player, a hi-fi system, a vehicle entertainment device, a car entertainment device, a portable video player, a Personal Digital Assistant (PDA), a medical communication system, a body-worn device, a speech communication device, and a hearing aid device. A "car entertainment device" may be a hi-fi system for an automobile.

The communication between different components of the device or between the device and further devices may be carried out in a wired manner (for instance using a cable) or in a wireless manner (for instance via a WLAN, infrared communication or Bluetooth).

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
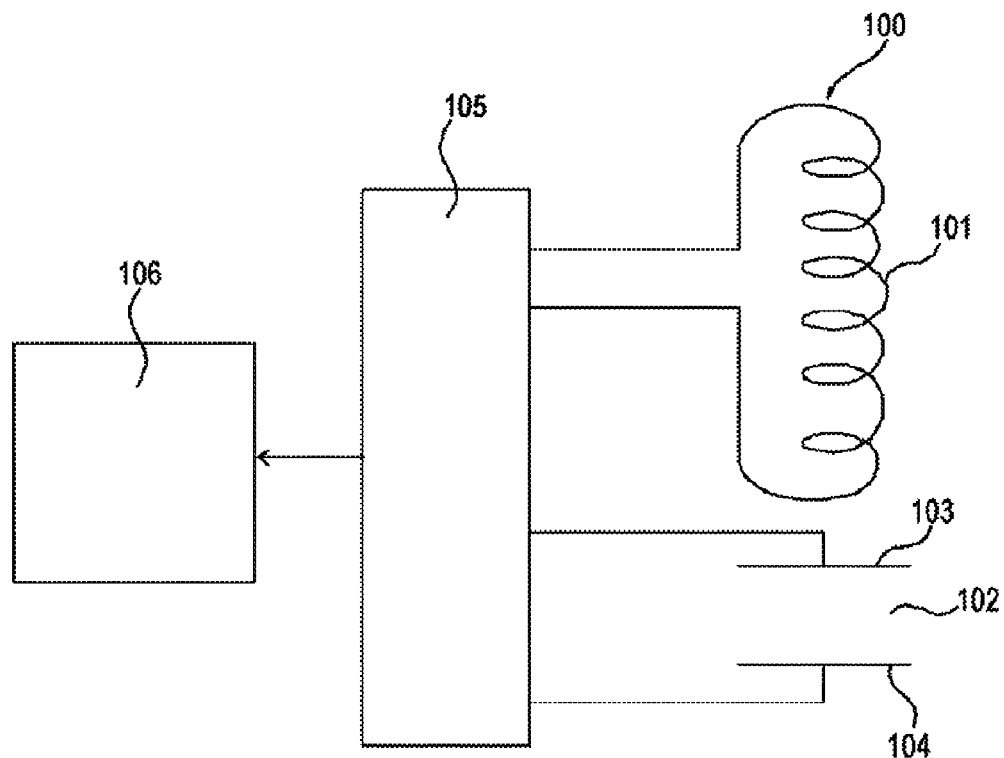
FIG. 1 and FIG. 2 show a communication device according to exemplary embodiments of the invention.

The illustration in the drawing is schematically. In different drawings, similar or identical elements are provided with the same reference signs.

In the following, referring to FIG. 1, a communication device 100 according to an exemplary embodiment of the invention will be explained.

The communication device 100 is a mobile phone carried by a human user and additionally adapted as a reader/writer device for reading data from a connected further communication device (not shown in FIG. 1) and for writing data into the further communication device. Such a further communication device may be a transponder or an RFID tag or may be a further mobile phone carried by another human user.

More particularly, FIG. 1 illustrates components of an electric circuit for such a communication device 100 for communicating with the further communication device.

The electric circuit comprises an inductive antenna element 101 for inductively communicating with the further communication device. In other words, the inductive antenna element 101, which may be a loop antenna, may communicate in a bidirectional manner with an RFID tag having a receiver/transmitter antenna via the inductive antenna element 101.

Furthermore, the circuit comprises a capacitive coupling element 102, namely a dipole antenna having a first macroscopic capacitor plate 103 and a second macroscopic capacitor plate 104 and adapted for communicating with a further communication device, which is also adapted for a capacitive communication. For instance, a capacitor plate of the further communication device may be coupled via a body of the human user to one of the plates 103, 104. For example, this may initiate an Active Digital Aura communication, in a similar manner as explained as such, for instance, in http://www.research.philips.com/password/archive/22/downloads/pw22_wireless.pdf, or in WO 01/15931 A1.

The communication device 100 is configured to allow any desired communication scheme of the group consisting of the inductive path 101 and the capacitive path 102, flexibly depending on a coupling scheme offered by a potential communication partner which is approaching to come within the communication range of the communication device 100.

As can further be taken from FIG. 1, the inductive antenna element 101 and the capacitive antenna element 102 are both coupled to a common matching circuit 105, which is adapted to match the impedances of the inductive antenna element 101 and of the capacitive antenna element 102 to achieve a proper cooperation or interaction with a processing unit 106, for instance including a microprocessor or a central processing unit (CPU).

In the configuration of FIG. 1, the inductive antenna element 101 and the capacitive antenna element 102 may communicate simultaneously or sequentially via the matching circuit 105 with the processing unit 106. A common frequency band for communicating with the system 100 is a frequency around 13.56 MHz.

In the following, referring to FIG. 2, an electric circuitry of a communication device 200 according to an exemplary embodiment will be explained in more detail.

Figure 2:
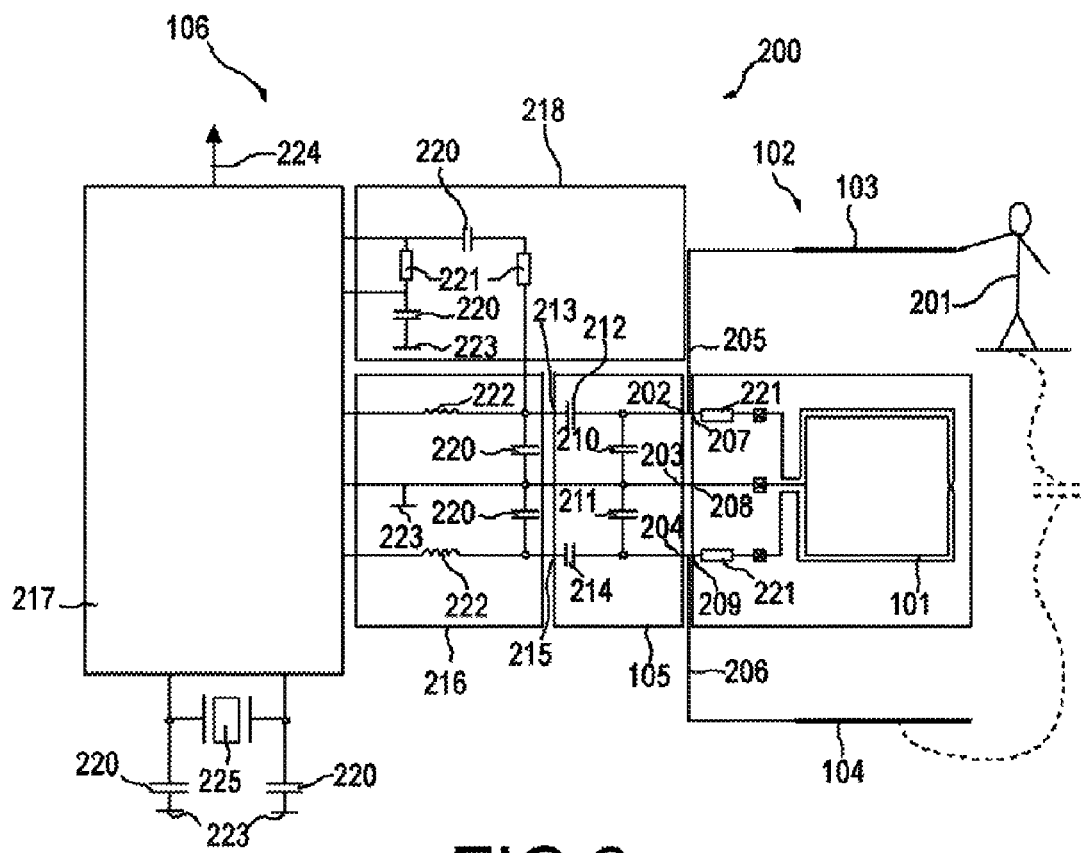

FIG. 2 shows a body of a human user 201 which characteristically modifies the capacitance properties of the capacitance plates 103 and 104 of the capacitive antenna element 102 by touching the first capacitor plate 103. Although not shown in FIG. 2, the user 201 may simultaneously touch a capacitor plate of a further communication device (not shown in FIG. 2) to initiate body coupled communication between the two communication devices using the capacitive coupling path.

Furthermore, the loop antenna 101 is shown in more detail in FIG. 2. Although not shown in FIG. 2, the communication device 200 may perform Near Field Communication with another communication device (for instance with an RFID tag located within the communication range of the device 200) using the inductive coupling path.

As can be taken from FIG. 2, the common matching circuit 105 comprises a first input 202, a second input 203 and a third input 204. The capacitive antenna element 102 comprises a first input 205 and a second input 206. The inductive antenna element 101 comprises a first input 207, a second input 208 and a third input 209. The first input 202 of the common matching circuit 105 is coupled to the first input 205 of the capacitive coupling element 102 and to the first input 207 of the inductive antenna element 101. The second input 203 of the matching circuit 105 is coupled to the second input 208 of the inductive coupling element 101. The third input 204 of the matching circuit 105 is coupled to the second input 206 of the capacitive coupling element 102 and to the third input 209 of the inductive antenna element 101. The common matching circuit 105 comprises a first capacity 210 coupled between the first input 202 of the common matching circuit 105 and the second input 203 of the common matching circuit 105. The common matching circuit 105 comprises a second capacity 211 coupled between the second input 203 of the common matching circuit 105 and the third input 204 of the common matching circuit 105. Beyond this, the common matching circuit 105 comprises a third capacity 212 coupled between the first input 202 of the common matching circuit 105 and a first output 213 of the common matching circuit 105. Moreover, the common matching circuit 105 comprises a fourth capacity 214 coupled between the third input 209 of the common matching circuit 105 and a second output 215 of the common matching circuit 105.

Furthermore, an EMC filter circuit 216 is coupled between the outputs 213, 215 of the common matching circuit 105 and a processor circuit 217. The logic circuit 217 is a PN511 circuit supporting Near Field Communication, but can be any other IC like an RS531. The PN511 is a highly integrated transmission module for contactless communication at 13.56 MHz. This transmission module utilizes an outstanding modulation and demodulation concept completely integrated for a variety of passive contactless communication methods and protocols at 13.56 MHz. It also supports ISO 18092.

The arrangement of FIG. 2 comprises a couple out circuit 218 for coupling signals out of the processor circuit 217 for subsequent transmission to a receiver device.

At various positions within the circuit array of FIG. 2, capacities 220, ohmic resistors 221, inductances 222, ground connections 223 and supply potential connections 224 are provided. Further, an oscillator 225 for providing a 27.12 MHz reference is connected to the processing unit 217.

Particularly the circuits 216 to 218, 105 may be provided as an integrated circuit.

The inductive antenna element 101 may have an inductance value of 100 nH to 3 µH. The capacitive antenna element 102 may have a capacitance value of some pF. The capacitances 210 to 212, 214 may have a capacitance value in the range between ten and some hundred pF. Thus, the "additionally connected" capacitive antenna element 102 only slightly disturbs the capacity arrangement 210 to 212, 214 what may explain that the addition of the capacitive antenna element 102 may be performed without the need to significantly redesign the remaining parts of FIG. 2.

The capacitances 220 of the EMC filter circuit 216 may have a capacitance value in the order of magnitude of some pF. The inductances 222 of the EMC filter circuit 216 may have an inductance value in the order of magnitude of 100 nH to 1 µH. The capacitances 220 of the couple out circuit 218 may have a capacitance value in the order of magnitude of 100 nF (filter capacitor 220 coupled to ground 223) and in the order of magnitude of 1 nF (blocking capacitor 220 coupled between the resistors 221). The resistors 221 of the couple out circuit 218 may have an ohmic resistance in the order of magnitude of (some) 1 kΩ.

The described values are design parameters for optimizing the performance of the device 200, particularly to adjust the performance in dependence of an operation frequency (for instance 13.56 MHz).

Figure 3:
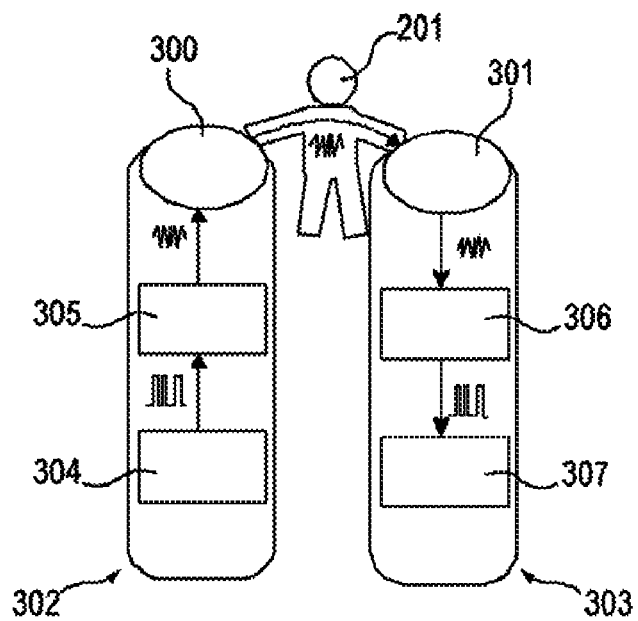
FIG. 3 and FIG. 4 show components of a communication device according to an exemplary embodiment of the invention including an Active Digital Aura function.

FIG. 3 shows a diagram illustrating an Active Digital Aura system concept.

In such a communication system, the body of the human user 201 is provided between an electrode 300 of a transmitter unit 302 and an electrode 301 of a receiver unit 303. A signal generator 304 generates a signal, which may be modulated using a modulator 305. Via the communication between the electrodes 300, 301, intermediated capacitively the body 201, a signal may be supplied to a demodulator unit 306 of the receiver 303. A signal detector 307 may extract a signal.

Figure 4:
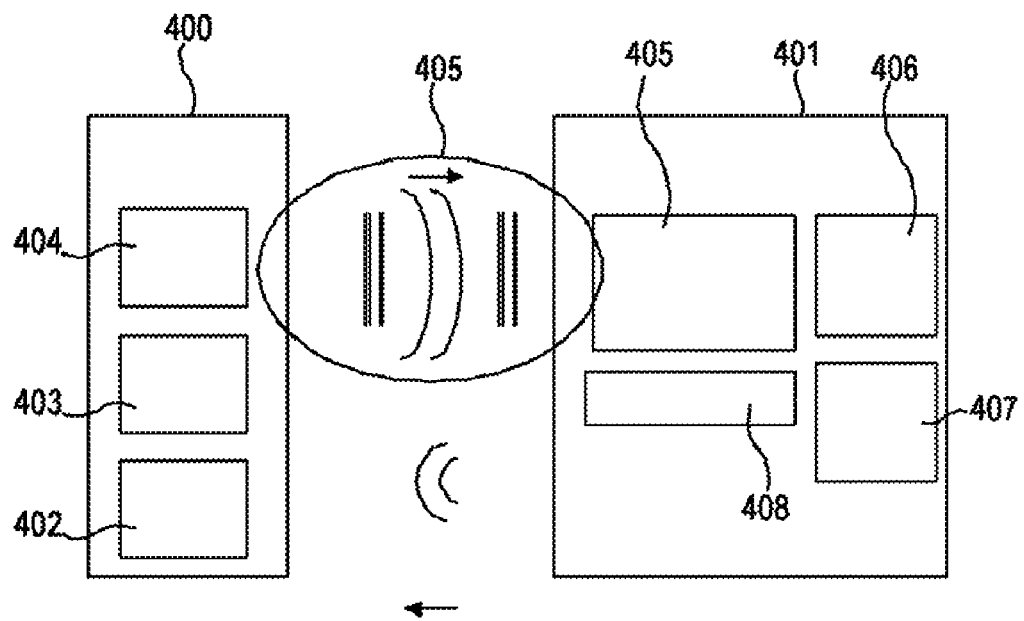

FIG. 4 shows a communication scheme between a reader 400 and an active identification module 401.

The reader 400 comprises an UHF receiver 402, a microcontroller 403 and a 125 kHz transmitter 404. Using a capacitive communication 405, signals may be supplied to the ActID module 401. A 125 kHz receiver 405 may receive these signals. Furthermore, the ActID module 401 comprises a wake up pattern detector 406, a power management unit 407, and a microprocessor 408.

The system of FIG. 4 may be used as an ADA module.

Figure 5:
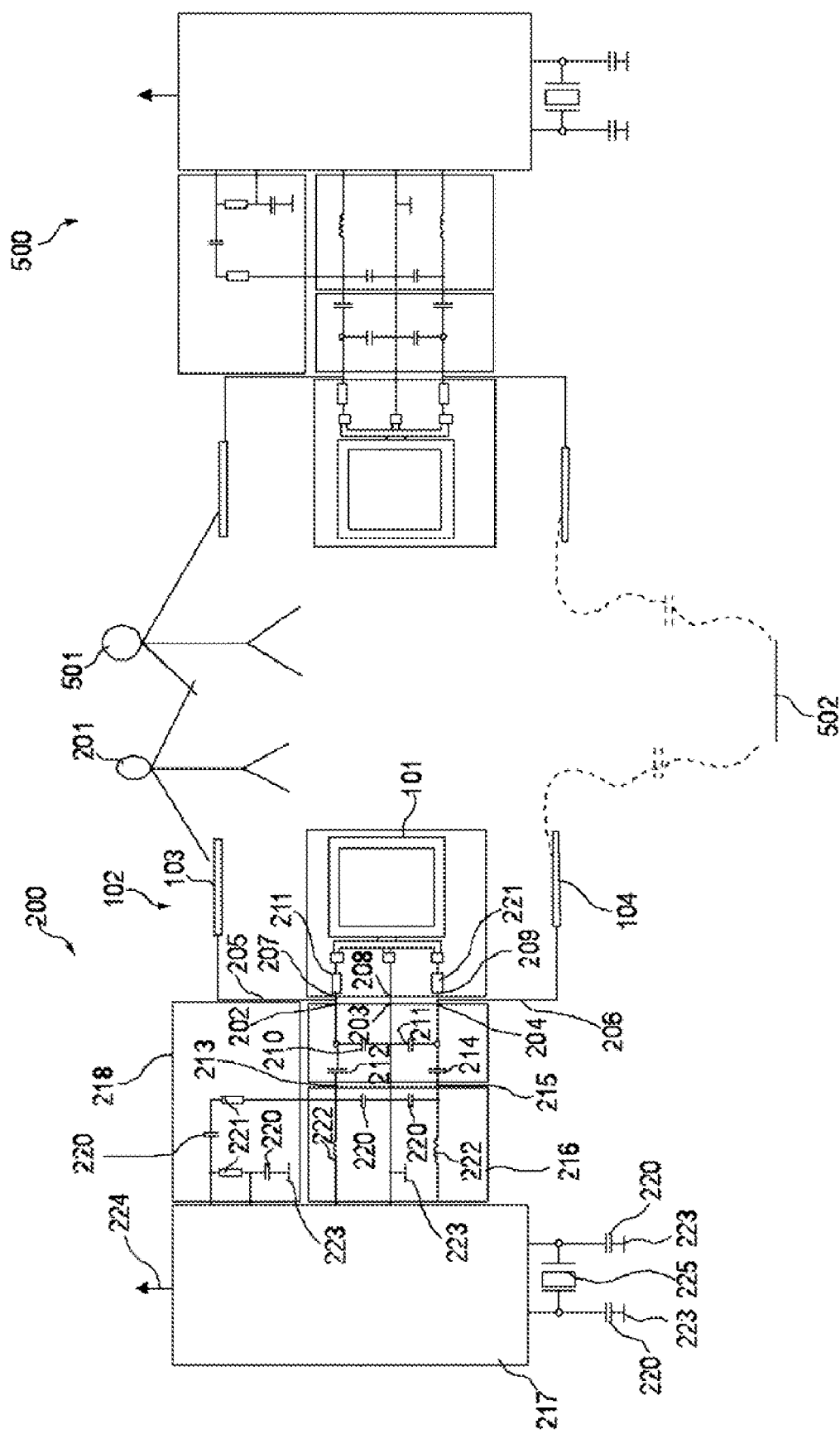
FIG. 5 shows a communication system formed by two communication devices according to an exemplary embodiment of the invention.

FIG. 5 shows a communication system formed by two communication devices 200, 500 according to an exemplary embodiment of the invention.

Two human users 201 and 501 shake their hands to exchange their visiting cards, which are stored electronically in the communication devices 200, 500 (configured as described above). By touching their hands and by simultaneously touching the electrodes 103 of their respective communication devices 200, 500, the users 201 and 500 initiate body coupled communication via the capacitive coupling path of their communication devices 200, 500. Thus, the personal information visiting cards which are stored electronically in the communication devices 200, 500 are automatically exchanged between the communication devices 200, 500 via the capacitive coupling path. This includes a coupling to the environment via the ground 502 on which the human users 201 and 501 are standing.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. An electric circuit for a communication device (200), which communication device is adapted for communicating with a further communication device, the electric circuit comprising:
    at least two inputs for connecting an inductive antenna element to said electric circuit;
    at least one input for connecting a capacitive antenna element to said electric circuit; and
    a common matching circuit connected to said inputs and adapted to match the impedances of the inductive antenna element and of the capacitive antenna element to further units of said electric circuit, which are adapted to process a signal received via said inductive antenna element and/or said capacitive antenna element.

2. The electric circuit according to claim 1, wherein the inductive antenna element and the capacitive antenna element are adapted for communicating independently from one another.

3. The electric circuit according to claim 1, wherein the inductive antenna element and the capacitive antenna element are adapted for communicating using the same frequency band, particularly in a high frequency band.

4. The electric circuit according to claim 1, wherein the capacitive antenna element is adapted for capacitively communicating involving a body of a human user.

5. The electric circuit according to claim 1, wherein the capacitive antenna element is adapted for capacitively communicating based on the Active Digital Aura technology.

6. The electric circuit according to claim 1, wherein the inductive antenna element is adapted for inductively communicating based on Near Field Communication.

7. The electric circuit according to claim 1, wherein the inductive antenna element is adapted for inductively communicating with a radio frequency identification tag or with a smart card.

8. A communication device for communicating with a further communication device, the communication device comprising:
    an electric circuit according claim 1;
    an inductive antenna element adapted for inductively communicating with the further communication device and connected to said electric circuit via said inputs; and
    a capacitive antenna element adapted for capacitively communicating with the further communication device and connected to said electric circuit via said inputs.

9. The communication device according to claim 8, adapted as at least one of a reader device for reading data from the further communication device, a write device for writing data into the further communication device, and a reader/writer device for reading data from the further communication device and for writing data into the further communication device.

10. The communication device according to claim 8, realized as at least one of the group consisting of a mobile phone, a Personal Digital Assistant, a GSM device, headphones, earphones, a headset, an earpiece, an ear set, a body-worn actuator, a gaming device, a portable audio player, a DVD player, a CD player, a harddisk-based media player, an internet radio device, a public entertainment device, an MP3 player, a hi-fi system, a vehicle entertainment device, a car entertainment device, a portable video player, a medical communication system, a body-worn device, a speech communication device, and a hearing aid device.

* * * * *